US012114404B2

(12) United States Patent
Fox et al.

(10) Patent No.: US 12,114,404 B2
(45) Date of Patent: Oct. 8, 2024

(54) WARNING LIGHT CONTROL SYSTEM WITH VARIABLE FLASHING RATE

(71) Applicant: Railway Equipment Company, Inc., Delano, MN (US)

(72) Inventors: David K. Fox, Boca Grande, FL (US); Jason Honeck, Maple Grove, MN (US)

(73) Assignee: Railway Equipment Company, Inc., Delano, MN (US)

( * ) Notice: Subject to any disclaimer, the term of this patent is extended or adjusted under 35 U.S.C. 154(b) by 55 days.

(21) Appl. No.: 17/951,880

(22) Filed: Sep. 23, 2022

(65) Prior Publication Data

US 2023/0093221 A1 Mar. 23, 2023

Related U.S. Application Data

(60) Provisional application No. 63/247,496, filed on Sep. 23, 2021.

(51) Int. Cl.

*H05B 45/32* (2020.01)
*B61L 29/28* (2006.01)
*B61L 29/32* (2006.01)
*H05B 47/16* (2020.01)

(52) U.S. Cl.

CPC ............ *H05B 45/32* (2020.01); *B61L 29/288* (2013.01); *B61L 29/32* (2013.01); *H05B 47/16* (2020.01)

(58) Field of Classification Search

CPC .......... B61L 29/24; B61L 29/28; B61L 29/30; B61L 29/32; B61L 29/226; B61L 29/286; B61L 29/288; B61L 5/189; B61L 9/04; B61L 2207/02; F21V 23/0407; F21V 23/0492; H05B 45/32; H05B 47/16

See application file for complete search history.

(56) References Cited

U.S. PATENT DOCUMENTS

| | | | | |
|---|---|---|---|---|
| 5,122,797 | A * | 6/1992 | Wanasz | B60Q 7/00 340/908 |
| 7,195,211 | B2 * | 3/2007 | Kande | B61L 29/16 246/473.1 |
| 9,079,593 | B1 * | 7/2015 | Burns | B61L 29/226 |
| 2018/0202636 | A1 * | 7/2018 | Fox | B61L 29/28 |
| 2018/0222506 | A1 * | 8/2018 | Kranz | B61L 29/224 |
| 2019/0351926 | A1 * | 11/2019 | Ibarra | B61L 29/288 |
| 2021/0070330 | A1 * | 3/2021 | McGavock, Jr. | H05B 47/18 |

* cited by examiner

*Primary Examiner* — Tung X Le

(74) *Attorney, Agent, or Firm* — Merchant & Gould P.C.

(57) ABSTRACT

A method of operating a warning light assembly at a railway crossing, as well as a warning light assembly operable in accordance with such a method, are disclosed. An example method includes receiving a voltage signal at the warning light assembly that corresponds to a railway crossing event. The method includes initiating a warning light flashing sequence that includes, during a first time period, illuminating the warning light during receipt of the voltage signal in a flashing pattern having a flashing frequency. The warning light flashing sequence also includes, during a second time period after the first time period, discontinuing the flashing pattern and illuminating the warning light in accordance with the voltage signal. Upon determining that receipt of the voltage signal at the warning light assembly is discontinued for at least for a predetermined time, the warning light flashing sequence is reinitialized for a next railway crossing event.

20 Claims, 7 Drawing Sheets

WARNING LIGHT CONTROL SYSTEM WITH VARIABLE FLASHING RATE

CROSS-REFERENCE TO RELATED APPLICATIONS

The present application claims priority from U.S. Provisional Patent Application No. 63/247,496, filed on Sep. 23, 2021, the disclosure of which is hereby incorporated by reference in its entirety.

BACKGROUND

For many years, warning systems at highway railroad grade crossings have been installed and maintained to protect motorists, pedestrians, and others, from collisions with trains. As part of these warning systems, electrically powered lights are mounted in a number of positions, usually at the side of the roadway, on structures extending over the roadway, and on barrier arms that are lowered across the roadway. These warning systems activate before the train reaches the crossing, typically at least 20 seconds prior to the train reaching the crossing. Operation continues until the train has passed completely through and is beyond the crossing. Depending on the length of the train and its speed, the warning system may be in operation for as much as 15 minutes.

These warning systems have typically consisted of one or more lights that operate with a distinct flashing pattern, or one or more lights that may operate continuously, during the period when the warning system is operating. The typical pattern for the flashing light(s) is to turn the electrical power to the light in an on and off cycle of approximately one second. The recommended switching rate is within a range of 0.8 seconds to 1.25 seconds (resulting in a total cycle time of approximately 2 seconds), with the "on" and "off" periods being equal.

While traditional flashing patterns have been in place for a significant amount if time, there remains an ongoing effort to improve safety at railway crossing locations. Accordingly, new approaches to improve safety, such as by improving driver attentiveness at highway railroad grade crossings, remain desirable.

SUMMARY

In accordance with the present disclosure, the above and other issues are addressed by the following:

In a first aspect, a method includes receiving a voltage signal at the warning light assembly that corresponds to a railway crossing event. The method includes initiating a warning light flashing sequence that includes, during a first time period, illuminating the warning light during receipt of the voltage signal in a flashing pattern having a flashing frequency. The warning light flashing sequence also includes, during a second time period after the first time period, discontinuing the flashing pattern and illuminating the warning light in accordance with the voltage signal. Upon determining that receipt of the voltage signal at the warning light assembly is discontinued for at least for a predetermined time, the warning light flashing sequence is reinitialized for a next railway crossing event.

In a second aspect, a method of operating a warning light assembly at a railway crossing is disclosed. The method includes receiving, at a warning light assembly including a first warning light, a voltage signal, the voltage signal corresponding to a railway crossing event and being supplied to the first warning light at a switching frequency. The method also includes initiating a warning light flashing sequence. The warning light flashing sequence includes, during a first time period, illuminating the first warning light during receipt of the voltage signal in a flashing pattern, the flashing pattern having a flashing frequency of at least two flashing events within a single switching period defined by the switching frequency. The warning light flashing sequence also includes, during a second time period after the first time period, discontinuing the flashing pattern and illuminating the warning light in accordance with the voltage signal at the switching frequency. Upon determining that receipt of the voltage signal at the warning light assembly is discontinued for a plurality of switching periods, the method includes reinitializing the warning light flashing sequence for a next railway crossing event.

In a third aspect, a warning light assembly includes a light emitting device and a control circuit having an input voltage connection. The control circuit is operatively connected to the light emitting device to selectively illuminate the light emitting device. The control circuit is configured to: receive a voltage signal at the input voltage connection in response to a railway crossing event, and initiate a warning light flashing sequence. The warning light flashing sequence includes, during a first time period, illuminating the light emitting device during receipt of the voltage signal in a flashing pattern, the flashing pattern having a flashing frequency of at least two flashing events per second. The warning light flashing sequence also includes, during a second time period after the first time period, discontinuing the flashing pattern and illuminating the light emitting device in accordance with the voltage signal. The warning light flashing sequence further includes, upon determining that receipt of the voltage signal at the warning light assembly is discontinued for at least for a predetermined time of at least five seconds, reinitializing the warning light flashing sequence for a next railway crossing event.

DETAILED DESCRIPTION

Figure 1:
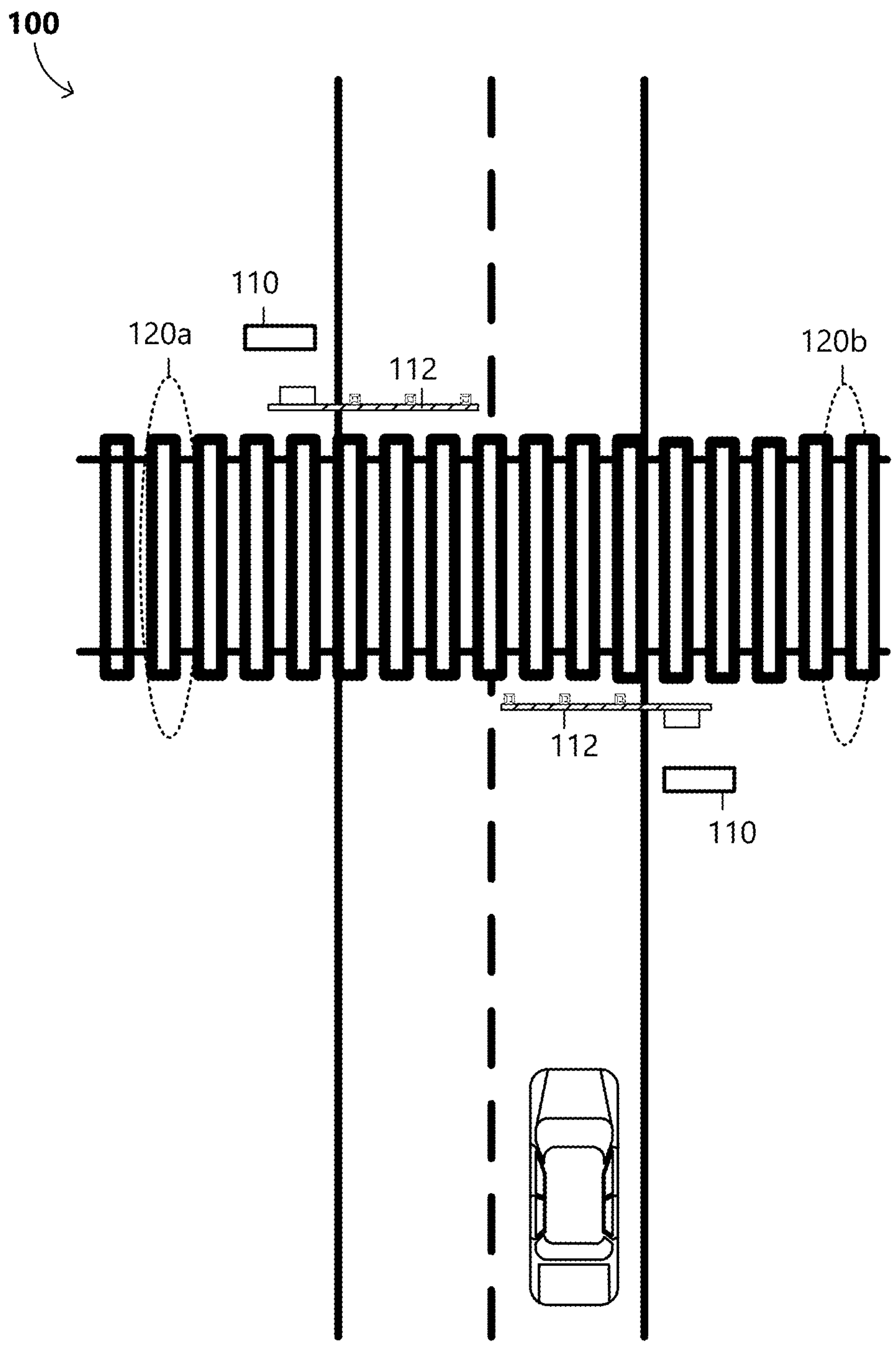
FIG. 1 illustrates a highway railroad grade crossing at which aspects of the present disclosure can be implemented.

As briefly described above, embodiments of the present invention are directed to a method of controlling a warning system at a highway railroad grade crossing. In general, a warning light system may include one or more signaling devices, e.g., warning lights, which flash during a crossing event. While traditional crossing events result in a lower-rate flashing pattern being displayed, such a flashing pattern may be easily disregarded by vehicle operators. As such, in some cases, a higher rate flashing pattern may be used by the one or more signaling devices during at least a first period of time during a crossing event. However, because railway crossing events may take some time (on the order of a few minutes) it can become significantly irritating to vehicle operators to be exposed to a high rate flashing pattern during the entirety of the crossing event. Accordingly, in some instances, a lower rate flashing pattern may be used after a predetermined period of time has elapsed. The lower rate flashing pattern would be allowed to continue to operate, thereby communicating that the crossing event continues to occur. However, switching to the lower rate flashing pattern does so in a less irritating way to those viewing the warning light system. Upon completion of the crossing event, the sequence of flashing patterns is reset, such that in the case of a next railway crossing event, the higher rate flashing pattern is again performed prior to a lower-rate flashing pattern. In this way, two advantages are obtained concurrently: a higher rate flashing pattern may be used to better initially catch the attention of vehicle operators and/or pedestrians in a vicinity of a crossing, while a lower rate flashing pattern may be used to continue to indicate a hazard condition without incurring observer irritation or distress.

In some instances, the change from a high rate flashing pattern to a lower rate flashing pattern may be accomplished using a high rate flashing controller. Such a controller may be integrated with a warning light in a warning light assembly, and used as a way to avoid reprogramming a main controller or individual controllers of warning lights, while enabling such a warning light assembly to emit both flashing patterns. In further instances, the change from a high rate flashing pattern to the lower rate flashing pattern may be accomplished using high rate flashing controllers for each flashing device that is included at a railway crossing. Such a configuration, described below, may also avoid reprogramming or reconfiguration of a main controller at the railway crossing.

In some embodiments, the methods and systems described herein take advantages of advances in the operation of warning lights available for use at railway crossings. For example, light-emitting diodes may provide some power savings over incandescent bulbs, but have a side effect of also being able to be rapidly turned on and off. This allows for introduction of an additional pattern of operation of the warning lights. In this pattern, during the period when the warning light is receiving electrical power, whether continuously, or in the flashing pattern described above, there is another on and off cycling of the electrical power to the light(s). This rate is typically at least two on/off cycles per second. In the two operational modes described above, a warning light might flash continuously at more than two cycles per second. Or, a light may flash at least 2-3 times per second for the approximate one second of the "on" cycle, then be completely off for the approximate one second "off" cycle. This resulting "high rate" pattern of operation of the highway crossing warning lights will provide a significantly greater visibility and conspicuity to the public.

This "high rate" flashing pattern of the warning lights will indeed provide greater visibility, conspicuity, and thus awareness of trains that are approaching the crossing, However, it may not be necessary to maintain the "high rate" once the train has reached and entered the crossing and for the duration of time until the train has passed through the crossing. For a motorist that is in a car waiting for the train to pass, having the lights cycle at the higher rate may actually be aggravating and an annoyance. As such, it may be desirable to discontinue the high rate flashing pattern and return the warning lights to either continuous operation, or the lower on-off flashing rate of approximately one second.

With the features of the railway crossing signaling devices of the present application, the "high rate" of flashing of the crossing warning lights commence when the highway crossing warning system is first activated, continue for a timed period, and then revert to a non "high rate" mode. This initial timed period would be adjustable, set at least to the amount of time it would take for the train to enter the crossing. This might typically be a minimum time of five to ten seconds, up to as much as two minutes. Once the highway crossing warning system has been de-activated, the timing functions would reset. For example, if a warning light assembly has not received voltage for a predetermined number of flashing cycles or a predetermined (e.g., programmable) period of time, such as 5-10 seconds, the timing functions would reset such that a next railway crossing event would be initialized to begin with a high rate flashing sequence.

Referring to FIG. 1, an example environment in which aspects of the present disclosure may be implemented is shown. In the example shown, a railway crossing 100 is depicted at which a road 102 and railway 104 intersect. The railway crossing 100 is, in the example shown, a controlled intersection that includes detection and notification features.

At the railway crossing 100, equipment may be installed to provide notification to motorists that a railcar is approaching on the railway 104. In the example shown, the road 102 corresponds to a two lane road (one lane in either direction). Accordingly, the railway crossing 100 includes a pair of notification equipment installations, one for each direction of traffic along the road 102. However, in alternative applications, the railway crossing features described herein can be used with other roadway configurations having more than two lanes; in such configurations, the pair of notification equipment installations may be used, as well as added signaling as may be determined to be advisable to provide adequate notice to motorists. In the example shown, the railway crossing 100 includes a control box 110 communicatively connected to a gate arm assembly 112 and a warning light assembly 114. Such a collection of components may be located on either side of the road 102. In some examples, a single control box 110 may be used to control gate arm assemblies and warning light assemblies on both sides of a road 102 concurrently.

In addition, a sensor device 120*a-b* is positioned on the railway 104 spaced a predetermined distance in each direction from the railway crossing, and electrically connected to the control box 110. In example embodiments, the sensor devices 120*a-b* may be implemented as inductive sensors in which a current is induced by a large metallic object on the tracks at a predetermined distance from the railway crossing 100. For example, upon approach of a railcar on the railway from either direction, one of sensor devices 120*a-b* will have a current induced therein, thereby causing a signal to be received at the control box 110 indicative of an approaching railcar, causing the control box to initiate a warning light operation sequence.

Figure 2:
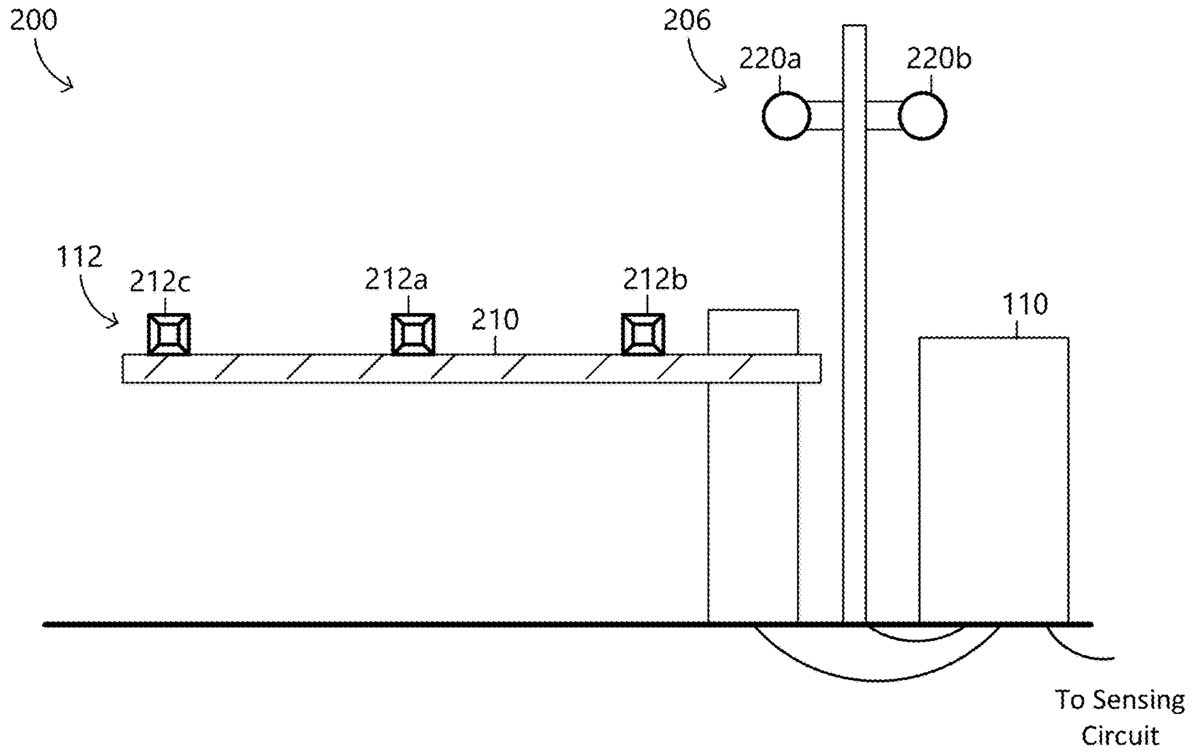
FIG. 2 illustrates an example signaling device having a variable flashing rate control system.

FIG. 2 illustrates an example warning system 200 that may be implemented on either or both sides of a roadway at a railway crossing, such as the railway crossing 100 of FIG. 1. In the example shown, the warning system 200 includes the control box 110, gate arm assembly 112, and warning light assembly 114.

The control box 110 contains a main controller and a power source, usable to deliver power and control signals to one or both of the gate arm assembly 112 and warning light assembly 114. The control box 110 also receives one or more sensing signals, such as from a sensor device 120 (e.g., a sensing coil) positioned along a railway near the railway crossing, to provide advance notice of the presence of a railcar approaching the railway crossing.

In the embodiment shown, the gate arm assembly 112 includes a gate arm 210 and optionally one or more gate arm lights 212, shown as gate arm lights 212*a-c*. In the example shown, gate arm lights 212*a-b* are positioned generally along the gate arm, and gate arm light 212*c* is located at an end, or "tip" of the gate arm 210 itself. The gate arm 210 may, in a default position be raised to not block a roadway. However, as seen in FIG. 2, the gate arm 210 may also be lowered to a warning position, for example upon detection of an oncoming railcar at the control box 110.

In the embodiment shown, the warning light assembly 114 is positioned near the lane of oncoming traffic and oriented toward any oncoming traffic that may be present. The warning light assembly 114 includes, in the embodiment shown, at least two warning lights, and sometimes more than two warning lights. The warning lights may be implemented, for example, using light emitting diode assemblies.

In the particular illustration shown, the warning light assembly 114 also includes two flashing lights 220*a-b* positioned at opposite sides of the warning light assembly 206. More side and/or central lights could be used as well, in alternative embodiments; additionally, in some cases, a central light may be eliminated entirely. Generally, the side lights 220*a-b* flash in an alternating sequence, due to being wired to a common switch that toggles between positions to cause alternating illumination of the side lights 220*a-b*.

In some examples, gate arm lights 212*a-c* may be wired to the same power signal as side lights 220*a-b*, but gate arm light 212*c* may optionally bypass and/or avoid being affected by a switching or flashing control arrangement. For example, a "tip" light, such as gate arm light 212*c*, may be configured to flash alongside the side lights 212*a-b*, or may be set to be always on during a railway crossing event.

Figure 3:
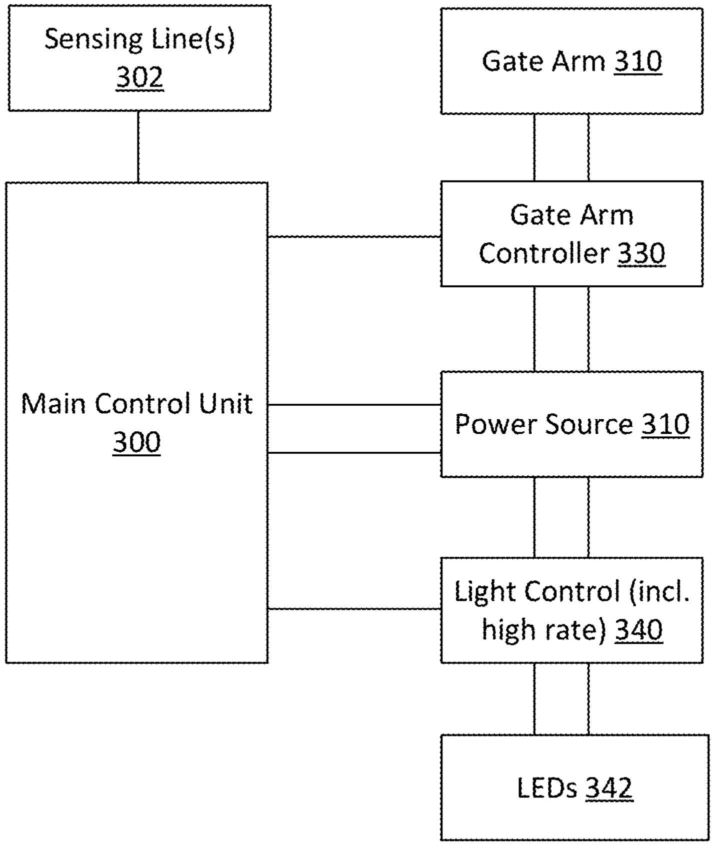
FIG. 3 is a schematic illustration of the signaling device of FIG. 2.

FIG. 3 is a schematic illustration of electronic components of the warning light system 200 of FIG. 2. In the example shown, the warning light system 200 includes a main control unit 300 that may be positioned within the control box 202, and receives signals from sensor devices 120*a-b* indicative of an approaching railcar, e.g., via sensing lines 302. A power source 310 provides electrical power (typically, direct current power via a long-life battery or rechargeable battery useable in conjunction with one or more renewable energy sources (e.g., solar panels, a wind turbine, or vibration and/or RF energy harvesting devices).

The power source 310 also provides electrical power to a gate arm controller 330 and gate arm 210, as well as to a light controller 340, and lighting devices 342 (optionally included in the warning light assembly as side lights 220*a-b*, or positioned on the gate arm as gate arm lights 212*a-c*).

In operation, the main control unit 300 will determine the presence of an oncoming railcar via sensing lines 302, received from sensor devices 120*a-b*. The main control unit 300 will send a signal to the gate arm controller 330, causing the gate arm to be lowered. The main control unit will also transmit an activation signal to a light controller 340, causing power to be supplied by the light controller to lighting devices 342. The light controller 340 will also actuate a switch assembly 344, for example to cause alternating illumination of two or more of the lighting devices, e.g., the side lights 220*a-b* and/or gate arm lights 212*a-c*. The light controller 340, switch assembly 344, and associated lighting devices represent an example of a signaling device using a variable flashing rate control system, according to example embodiments described herein.

Figure 4:
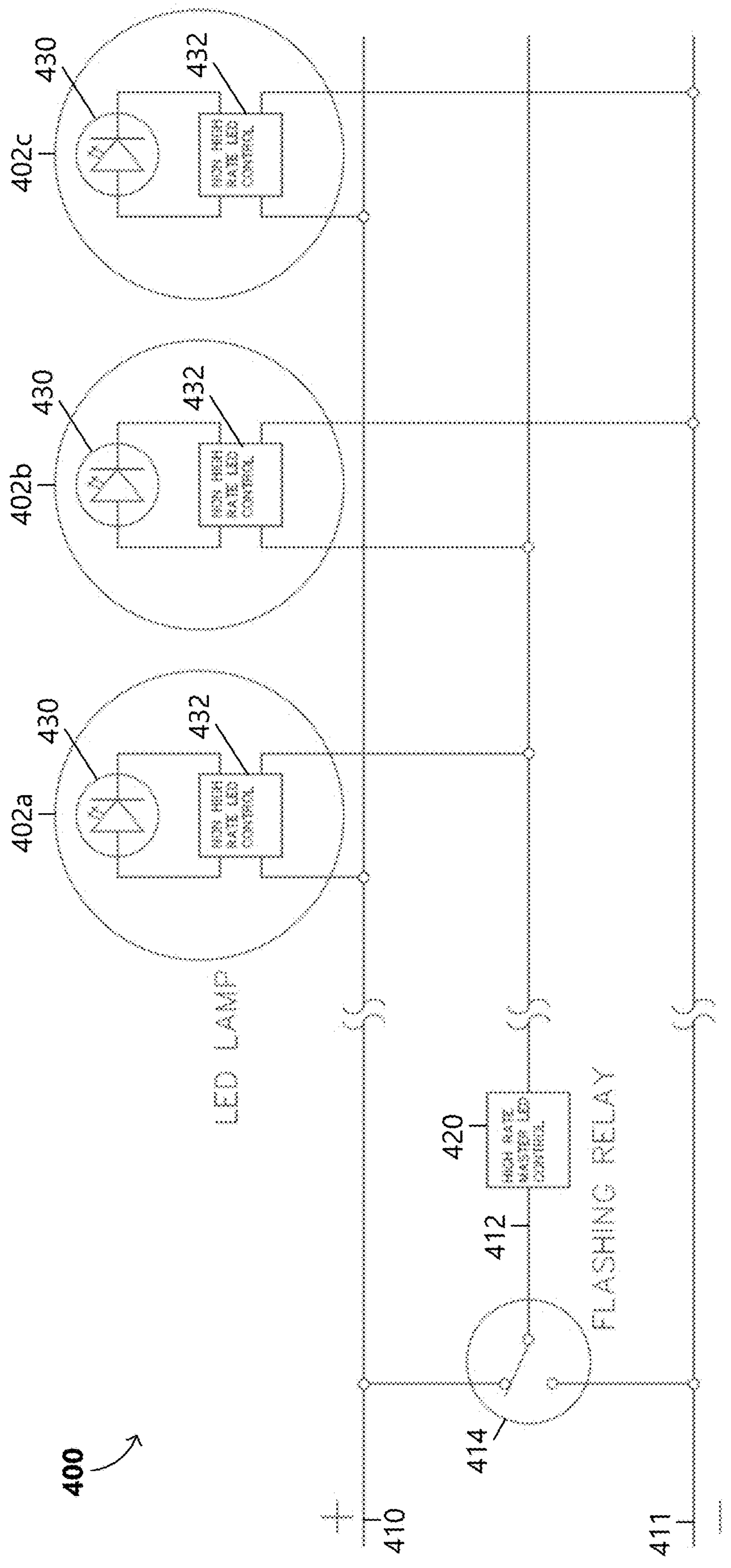
FIG. 4 is a schematic diagram of an example signaling device useable in a warning light system that uses a variable flashing rate control system.
Figure 5:
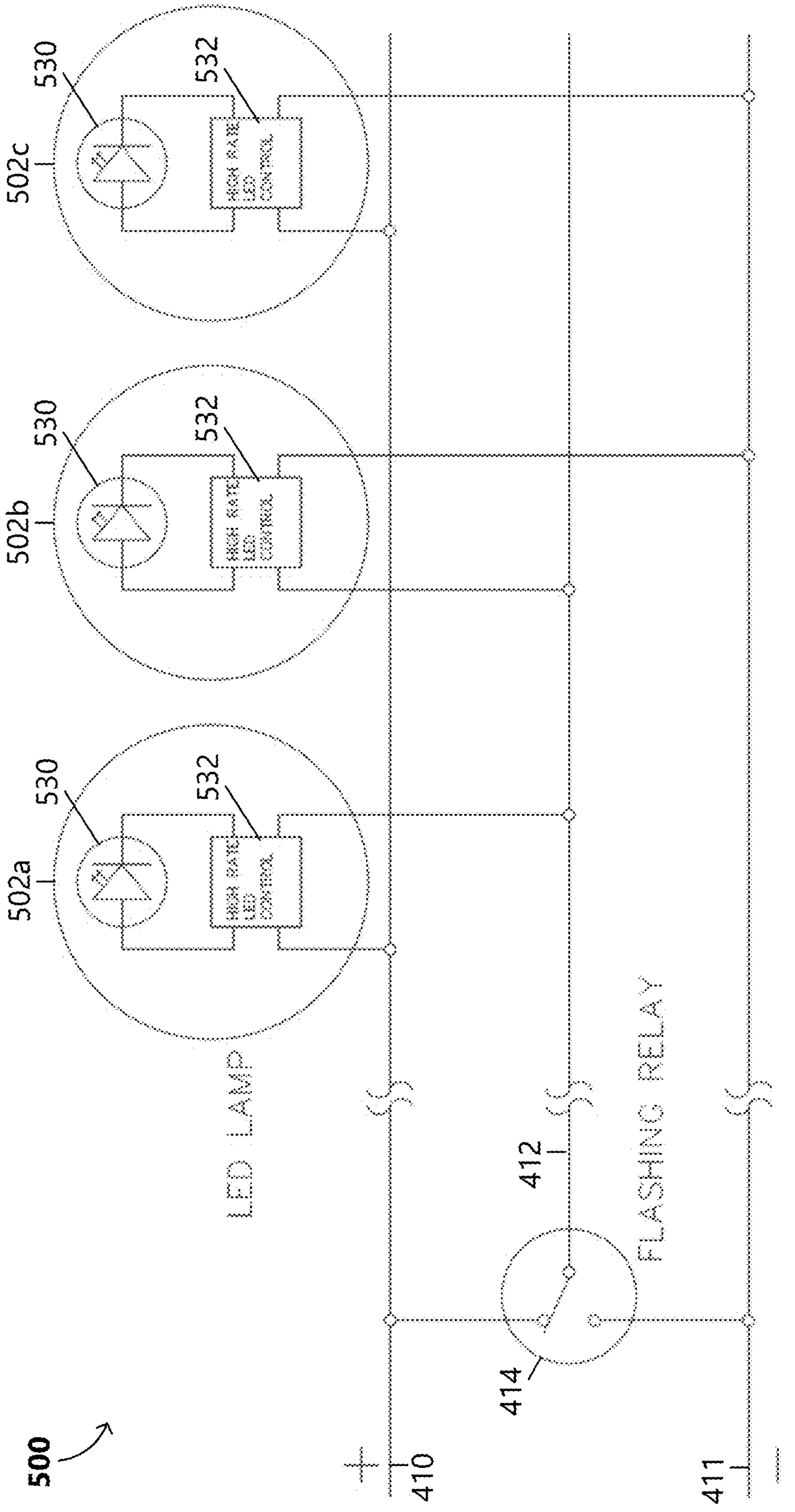
FIG. 5 is a schematic diagram of an example signaling device useable in a warning light system that uses a variable flashing rate control system.

Referring now to FIGS. 4-5, example implementations of a signaling device, including a light controller and associated set of lighting devices, are disclosed. FIG. 4 is a schematic diagram of a first example signaling device 400 usable in a warning light system that uses a variable flashing rate control system. In some examples, the signaling device arrangements described herein form example embodiments of a gate lamp assembly.

In the example shown, the signaling device 400 includes a plurality of light emitting diode lamps 402*a-c*. Each of the light emitting diode lamps 402*a-c* includes a corresponding light emitting diode 430, and a LED control circuit 432. Each light emitting diode 430 is configured to illuminate upon receipt of a voltage from the associated LED control circuit 432. Each LED control circuit 432 receives a DC voltage from signal lines connected to the respective one of the light emitting diode lamps 402*a-c*, and provides a current-regulated DC voltage to the associated light emitting diode 430, causing the respective light emitting diode to illuminate when voltage is present on the connected signal lines. In an example implementation, light emitting diode lamps 402*a-c* may be useable as gate arm lights 212*a-c*, as described above, respectively.

In the embodiment shown, a power signal is provided to the signaling device 400 in the form of a direct current (DC) voltage on voltage lines 410, 411. The voltage lines 410, 411 may be received from a power source, such as power source 310 described above. A third signal line 412 is electrically connected to the voltage lines 410, 411 via a switch 414. The switch 414 allows for alternating connection of the signal line 412 to each voltage line 410, 411. Also connected to the signal line 412 is a high rate LED controller 420, operation of which is described below.

As illustrated, a first light emitting diode lamp 402*a* is electrically connected between voltage line 410 and signal line 412, second light emitting diode lamp 402*b* is electrically connected to voltage line 411 and signal line 412, and third light emitting diode lamp 402*c* is electrically connected across the voltage lines 410, 411. Accordingly, in the presence of DC voltage across voltage lines 410, 411, the first and second light emitting diode lamps 402*a-b* either (1) receive the DC voltage, or (2) are effectively grounded, as no DC voltage is provided, depending on a position of the switch 414.

As noted above, each of the light emitting diode lamps 402*a-c* includes a light emitting diode 430 electrically connected to an integrated control circuit 432. The integrated control circuit 432 provides voltage and current control to output a voltage and current appropriate for illumination of the light emitting diode 430 in response to receive of a voltage on the voltage lines to which that light emitting diode lamp 402*a-c* is connected (e.g., two of the lines 410, 411, and 412). In some embodiments, the light emitting diode lamps 402*a-c* may be considered warning light assemblies, as discussed in the context of the present disclosure. In other embodiments, one or more of the light emitting diode lamps, in conjunction with the high rate LED controller 420, may be referred to as a warning light assembly.

In particular, when the switch is in a first position (seen in FIG. 4), the signal line 412 is tied to the signal value of voltage line 410, and therefore no voltage differential will be provided to the first light emitting diode lamp 402*a*. Accordingly, the light emitting diode 430 of the first light emitting diode lamp 402*a* will not illuminate. At the same time, the light emitting diode 430 of the second light emitting diode lamp 402*b* will receive a voltage based on a voltage difference appearing across signal line 412 and voltage line 411, and will therefore illuminate.

When the switch is in a second position (not shown), the signal line 412 is tied to the signal value of voltage line 411, and therefore no voltage differential will be provided to the second light emitting diode lamp 402*b*. Accordingly, the light emitting diode 430 of the second light emitting diode lamp 402*b* will not illuminate. At the same time, the light emitting diode 430 of the first light emitting diode lamp 402*a* will receive a voltage based on the voltage difference across signal line 412 and voltage line 410, and will therefore illuminate.

In example implementations, in the presence of an adequate voltage received on the voltage lines 410, 411, the switch 414 is electrically controlled to switch positions at a predetermined rate, e.g., approximately once per second (i.e., having a one-second half-cycle). Accordingly, the first and second light emitting diode lamps 402*a-b* will alternately illuminate at the predetermined rate. Furthermore, the third light emitting diode lamp 402*c* will remain constantly illuminated while DC voltage across voltage lines 410, 411 is present. In such a configuration, the first and second light emitting diode lamps 402*a-b* may correspond to side lights 220*a-b* or gate arm lights 212*a* and 212*b* described above, while the third light emitting diode lamp 402*c* may correspond to a central gate arm light 212*c* (or alternatively, central gate arm light 212*a*).

In the example shown, the high rate LED controller 420 may be used to modify the flashing sequence described above. For example, the high rate LED controller 420 may, at a time voltage is received across voltage lines 410, 411, initiate a timer and selectively interrupt the signal provided to the respective one of the first or second light emitting diode lamp 402*a-b*, such that a voltage signal is received at either of lamps 402*a-b* at a higher rate than is reflected by the predetermined rate set at the switch 414 for a predetermined high flashing rate period. For example, the high rate LED controller 420 may be configured to operate for a first 15-20 seconds after a voltage is sensed at voltage lines 410, 411, and may be configured to interrupt voltage at signal line 412 at a rate of 2-10 times per second. This has an effect of causing the respective one of the first or second light emitting diode lamps 402*a-b* to flash on/off multiple times during each cycle of the predetermined rate set at the switch 414. In a particular example, for a voltage having a duration of 0.8 to 1.2 seconds, a flashing event may have a duration of up to about 300-350 milliseconds, thereby allowing two such flashing events to occur within the duration voltage is received at a particular light emitting diode lamp). After completion of the high flashing rate period (e.g., after an initial 15-20 seconds or more), the high rate LED controller 420 may be configured to allow a constant voltage to pass through to the signal line 412, thereby causing operation of the signaling device 400 to return to a lower-rate, alternating signal flashing controlled by the switching rate of the switch 414 for a remainder of the operating period (i.e., for the remainder of the period in which DC voltage is received on voltage lines 410, 411).

In example embodiments, the duration of the high flashing rate period may vary. For example, in some embodiments, the high flashing rate may be configured to operate for the first 10 to 15 seconds. In other embodiments, the high flashing rate may be configured to operate for up to 20 seconds. In still further embodiments, the high flashing rate may be configured to operate for up to 30 seconds. In still further embodiments, the high flashing rate is programmable at the high rate LED controller 420. Generally, the high flashing rate is configured to operate for a period of time immediately after receipt of voltage on the voltage lines 410, 411, such that a high flashing rate is output for an initial period to ensure that the signaling device 400 captures the attention of any drivers or pedestrians in the vicinity of the railway crossing. However, after the initial period, the signaling device 400 may revert to a lower frequency flashing rate to avoid annoyance or unnecessary distraction of drivers or pedestrians waiting for a railcar to pass.

FIG. 5 is a schematic diagram of a second example signaling device 500 usable in a warning light system that uses a variable flashing rate control system. In the example shown, the signaling device 500 includes a plurality of light emitting diode lamps 502*a-c*, each including a light emitting diode 530*a-c* and a high rate LED controller 532*a-c*. In example implementations, the light emitting doped lamps 502*a-c* may each be used to implement the gate arm lights 212*a-b*

In this embodiment, rather than including LED control circuits 432 and a separate high rate LED controller 420, each of the light emitting diode lamps 502*a-c* includes a light emitting diode 530 and a separate high rate LED controller 532. Accordingly, in this configuration, light emitting diode lamps 502*a-b* may be alternately activated via the switch 414 at a default, or lower, switching rate. Concurrently, all of the light emitting diode lamps 502*a-c* may be configured to flash according to a higher rate flashing frequency for an introductory period. Specifically, light emitting diode lamp 502*c* may constantly flash during an initial period of time, while light emitting diode lamps 502*a-b* will flash at the higher frequency, but will alternate in flashing sequence based on the position of switch 414.

In this example, each of the light emitting diode lamps 502*a-c* may be considered a warning light assembly as that term is discussed herein. In particular, each of the light emitting diode lamps 502*a-c* is generally interchangeable with each other and operate consistently, since each includes a high rate LED controller 532. Additionally, each of the light emitting diode lamps 502*a-c* is able to fit into a socket that might otherwise receive a light emitting diode lamp that lacks a high rate LED controller 532, and may be used to implement two different flashing rates in the manner described herein.

Referring to FIGS. 4-5, in alternative embodiments, more or fewer light emitting diode lamps may be included, thereby adjusting overall visibility of a signaling device. Furthermore, in some instances one or more of the light emitting diode lamps may not be configured to include a high rate LED controller. For example, in an alternative embodiment of the signaling device 500 of FIG. 5, the high rate LED controller 504*c* may instead be replaced by a standard LED control circuit, such as the control circuits 404 of FIG. 4. In such an instance, the light emitting diode lamp 502*c* would remain constantly on during the period of time a voltage is provided on signal lines 410, 411, rather than flashing at a high flashing rate during the initial period.

Additionally, referring to FIGS. 4-5, operation of light emitting diode lamps is described herein as occurring in the presence of voltage received on voltage or signal lines 410-412; however, it is recognized that the presence of voltage generally refers to the presence of a voltage differential across two such lines that is adequate to cause illumination of a light emitting diode, and the absence of voltage may refer to a zero voltage circumstance, or a circumstance in which some voltage difference is present but which is inadequate to cause illumination to occur. The presence of voltage may therefore be referred to as a high voltage event, and the absence of voltage may therefore alternatively be referred to as a low voltage event, consistent with the present disclosure.

Figure 6:
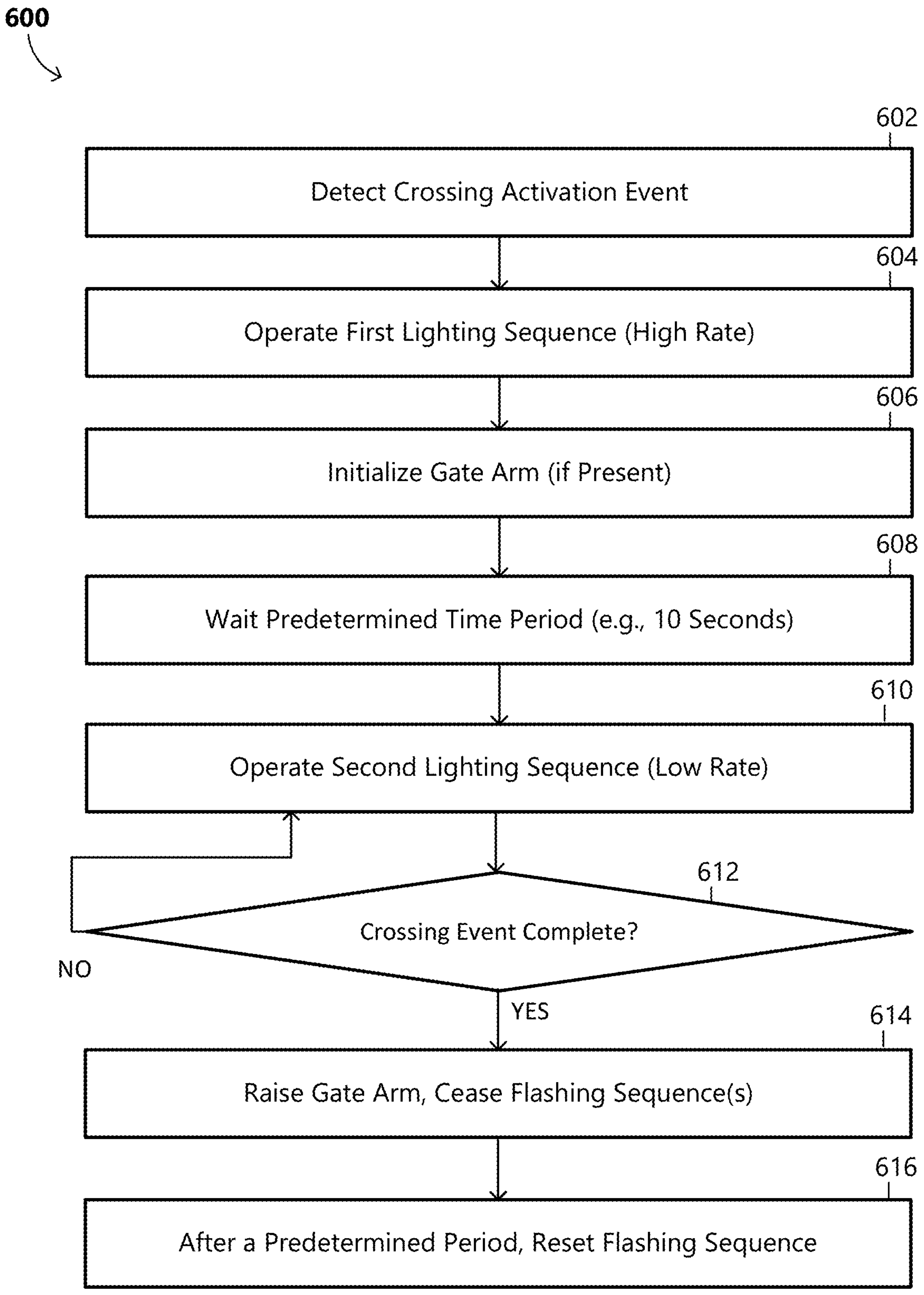
FIG. 6 is a flowchart of a method of operating a signaling device at a highway railway crossing in accordance with the present disclosure.

Referring now to FIG. 6, a flowchart of a method 600 of operating a signaling device at a highway railway crossing is shown, in accordance with the present disclosure. The method 600 may be performed, for example, using any of the signaling devices and a main controller located at a railway crossing described herein.

In the example shown, the method 600 includes detection of a crossing activation event at a railway crossing (step 602). Detection of a crossing activation of and may include receipt at a main control unit of a signal indicative of an approaching railcar, for example via signal lines 302 seen in FIG. 3, which in turn may receive signals from a sensor device, such as sensor device 120 of FIG. 1.

In the example shown, the method 600 further includes operating one or more signaling devices in accordance with a first lighting sequence (step 604). The first lighting sequence may correspond to a high rate flashing sequence performed using a plurality of light emitting diode lamps including alternating light emitting diode lamps as described above in FIGS. 4-5.

The method 600 optionally further includes initializing a gate arm (step 606). At railway crossings where a gate arm is present, initialization of the gate arm may cause the gate arm to be lowered, thereby blocking a walking or driving lane that crosses a railway.

The method 600 includes waiting a predetermined time period (step 608). The predetermined time period can be defined to be a particular amount of time during which a high frequency flashing sequence should be performed. For example, the predetermined time period may be 5 to 10 seconds in length. Other amounts of time, such as thirty seconds or up to a minute, may be used as well. In examples, the predetermined time period may be programmable independently at each high rate LED controller, such as controllers 432, 532 of FIGS. 4-5.

After waiting the predetermined time period, the method 600 continues by operating the one or more signaling devices in accordance with a second lighting sequence (step 610). The second lighting sequence can, in various embodiments, correspond to a slower rate flashing sequence, such as a default flashing sequence that could be performed after a high rate LED controller (e.g., controller 432, 532) has determined that a high rate flashing duration has been met. This can correspond to a first 15 to 20, or up to 30 or more seconds of a railway crossing event (which typically takes at least 1-2 minutes, and often significantly longer). Alternately, the high rate flashing duration may correspond to a time between when a railcar is first sensed as approaching the railway crossing until a time at which the railcar has either entered or passed the railway crossing intersection.

During this second lighting sequence, in examples, each warning light assembly may cause a light emitting diode to illuminate in accordance with receipt of a voltage signal, for example, when a voltage signal is received across a voltage line 410, 411 and signal line 412. That is, in some instances, the warning light assemblies may illuminate at a switching frequency in accordance with switch 414 (e.g., in the case of light emitting diode lamps 402*a*-*b*, 502*a*-*b*) or may remain constantly illuminated (e.g., in the case of light emitting diode lamps 402*c*, 502*c*).

Operation 612 can continue to monitor the railway crossing to determine if a crossing event has completed. If the crossing event has not yet completed, for example because of a railcar still approaching or a series of railcars currently passing through the intersection defined at the railway crossing, a voltage will continue to be supplied, and the second flashing sequence may continue to be operated. However, once the crossing event has completed and all railcars have passed through the railway crossing at the intersection, a voltage may be discontinued across voltage lines 410, 411. Accordingly, all flashing sequences may be halted, and, if a gate arm is present, the gate arm may be lifted (step 614). The crossing event may be determined to be completed based on the railcar no longer being sensed in proximity to the railway crossing by sensor devices 120, or optionally based on and elapsed time being achieved since either the railway crossing began or after a last railcar has been detected.

In the example shown, after a predetermined period following completion of the railway crossing event, the flashing sequence described above may be reset (step 616). For example, after a predetermined amount of time (e.g., 5-10 seconds) without receiving a voltage signal, the flashing sequence may be reset, such that during a next railway crossing event, the flashing sequence will be initiated first using a high rate flashing sequence followed by a low rate flashing sequence). In example embodiments, the predetermined amount of time before reset of the flashing sequence may be a preset amount of time, or may be a predetermined number of cycles where a voltage would be expected but which is not received. In some examples, the amount of time before reset of the flashing sequence may be programmable within the high rate LED controller(s) 432, 532 described above. Each of the high rate LED controllers may be configured with a common amount of time, or different amounts of time.

Figure 7:
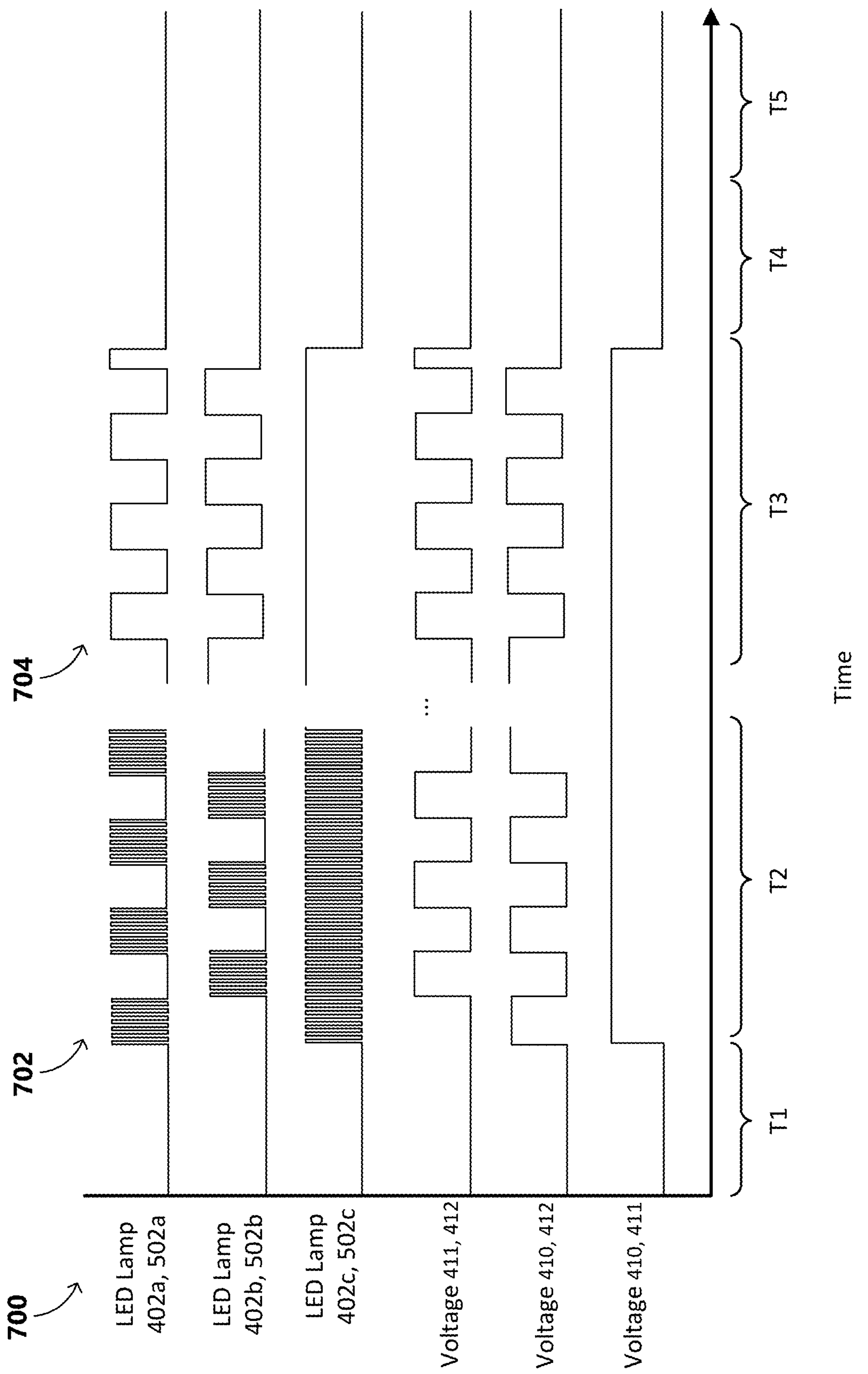
FIG. 7 is a timing diagram illustrating exemplary operation of a signaling device including a warning light assembly having two warning lights incorporated therein, according to an example implementation.

FIG. 7 illustrates an example timing diagram 700 showing operation of warning lights in accordance with example embodiments described herein. The example timing diagram 700 is intended as exemplary, and does not represent all possible implementations of high and low rate flashing sequence(s). In the example timing diagram 700, a series of time periods T1-T5 are illustrated. The time periods are not drawn to scale, and merely are used to highlight the first and second flashing sequences described above.

Generally, time period T1 represents a time before a railway crossing event occurs. During time period T1, no voltage is received across the voltage lines 410, 411, and therefore no voltage is delivered to any of the LED lamps forming the morning light assemblies described herein.

Within time period T2, a railway crossing event has been determined to occur, and voltage across the voltage lines 410, 411 is initiated. Due to periodic switching of a switch assembly 414, the voltage is provided at a predetermined period defined by be switching rate (e.g., in a range of 0.8 to 1.2 seconds between switching events which define each half-cycle), alternately across lines 410, 412 and then across lines 411, 412. As discussed above, light-emitting diode lamps 402*a*, 502*a* may receive voltage when there is a voltage present across lines 410, 412, and light emitting diode lamps 402*b*, 502*b* may receive voltage when there is a voltage present across lines 411, 412. Light emitting diode lamps 402*c*, 502*c* may receive a voltage during the entirety of the time voltage is present across lines 410, 411.

In the example shown, during time period T2, a high rate switching process occurs, and therefore during each period at which a warning light assembly receives a voltage across a pair of voltage lines 410-412, the voltage will be provided to the light-emitting diode of a light emitting diode lamp at a frequency higher than the frequency defined by the switching rate. In the example shown, during time period T2, two or more high-voltage events may be provided to a light-emitting diode 402*a-b*, 502*a-b* within a given period. In the example shown specifically, 7 separate voltage flashing events are shown to occur within each period; however, that flashing rate may be higher or lower, for example 2-10 flashes per period. As is further illustrated, optionally, a light emitting diode lamp 402*c*, 502*c* may receive the flashing events continuously during time period T2. This time period T3 is the time during which a first, high rate flashing sequence 702 occurs.

Time period T2 may last a configurable amount of time, for example 10 to 15 seconds, 20 seconds, or in some instances up to 30 seconds or more. The timing diagram 700, for purposes of simplicity, only shows a first 3 to 4 seconds of time period T2. As noted above, the length of time period T2 may be configurable, for example being programmable into a high rate flashing control circuit as described above.

In the example shown, time period T3 occurs after time period T2, and represents a continuation of a railway crossing event after the first amount of time for time period T2 has elapsed. During time period T3, the high rate flashing sequence will cease operation, and therefore each of the light emitting diode lamps will be illuminated continuously when voltage is received at that light emitting diode lamp. Accordingly, during time period T3, the time during which a given warning light assembly is illuminated is defined to be in accordance with the voltage signal received at that warning light assembly (i.e., as defined by a switching rate of switch 414 in the case of light-emitting diode lamps 402*a-b*, 502*a-b*, or continuously in the case of light emitting diode lamps 402*c*, 502*c*). This time period T3 is the time during which a second flashing sequence 704 occurs.

In the example shown, time period T4 occurs after time period T3, and represents completion of a railway crossing event. Time period T4 is configurable, in some embodiments, and represents an amount of time before a warning light assembly may be reset for a subsequent railway crossing event. That is, after time period T4 has elapsed (e.g., 5 to 10 seconds) without further receiving voltage signals on voltage lines 410-412, it can be determined that a railway crossing event has completed, and therefore the warning light assemblies used at a railway crossing may be reset. Accordingly, in time period T5, occurring after time period T4, any subsequent railway crossing event would result in restart of the high rate flashing sequence. Accordingly, in this instance, time period T5 is equivalent to time period T1.

Referring now to FIGS. 1-7 generally, it is noted that the signaling devices and methods of operation of such signaling devices described herein have a number of advantages over existing signaling processes. For example, while in existing signaling methods either a slow (regular) rate flashing sequence may be used or a high rate flashing sequence may be used for short duration events, the current devices and methods provide the improved visibility of a high rate flashing sequence, while avoiding annoyance to or disruption of motorists and pedestrians waiting for a railcar to pass through the intersection that would potentially be caused by prolonged operation at the high rate flashing sequence. Concurrently, risk of driver or pedestrian inattention due to the low rate flashing sequence occurring at an initial time that a railcar passes the railway crossing is reduced. Therefore, overall, and initial high visibility alert is provided followed by a visible, but lower intensity, alerting at the lower flashing rate.

Still further, it is noted that although described in the context of a railway crossing including a roadway having 2 lanes of bidirectional traffic, other railway crossings may utilize similar techniques. For example, two different flashing sequences may be used at a larger roadway and railway intersection having two or more sets of railroad tracks, or two or more lanes of traffic in each direction. Still further, pedestrian crossings may also utilize such high rate and lower rate flashing sequences where traditional, alternating light signaling would have been used.

Finally, it is noted that the changes in hardware required to implement such a dual rate flashing sequence of crossing are minimal. Specifically, a high rate LED controller, in the form of a small programmable circuit, would be required to be installed within a light control circuit. Alternately, such a high rate LED controller may easily be included in one or more light emitting diode lamps without requiring retrofit of either a main control circuit or light control circuit at all.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of railway crossings, in some examples, the technologies described herein may be applicable in crosswalks or other types of crossings.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method of operating a warning light assembly at a railway crossing, the method comprising:
  receiving, at the warning light assembly including a warning light, a voltage signal, the voltage signal corresponding to a railway crossing event;
  initiating a warning light flashing sequence, the warning light flashing sequence including:
    during a first time period, illuminating the warning light during receipt of the voltage signal in a flashing pattern, the flashing pattern having a flashing frequency of at least two flashing events per second;
    during a second time period after the first time period, discontinuing the flashing pattern and illuminating the warning light in accordance with the voltage signal; and
    upon determining that receipt of the voltage signal at the warning light assembly is discontinued for at least for a predetermined time of at least five seconds, reinitializing the warning light flashing sequence for a next railway crossing event.

2. The method of claim 1, wherein the first time period is at least 20 seconds.

3. The method of claim 1, wherein the voltage signal received at the warning light assembly is constant during the railway crossing event.

4. The method of claim 1, wherein the voltage signal comprises a periodic voltage signal having a switching frequency.

5. The method of claim 4, wherein the flashing frequency is at least twice the switching frequency.

6. The method of claim 4, wherein the periodic voltage signal includes a high voltage signal phase and a low voltage signal phase, and wherein, during the second time period, the warning light is illuminated during the high voltage signal phase and is not illuminated during the low voltage signal phase.

7. The method of claim 1, wherein the warning light assembly further includes a second warning light, and wherein the voltage signal is received in an alternating pattern between the warning light and the second warning light.

8. The method of claim 7, wherein the method includes, during the first time period, illuminating the second warning light during receipt of the voltage signal at the second warning light in a second flashing pattern, the second flashing pattern having a second flashing frequency of at least two flashing events per second.

9. The method of claim 8, wherein flashing frequency is the same as the second flashing frequency.

10. The method of claim 1, wherein the warning light is mounted on a gate arm at the railway crossing.

11. The method of claim 1, wherein the warning light comprises an LED warning light.

12. A method of operating a warning light assembly at a railway crossing, the method comprising:
  receiving, at the warning light assembly including a first warning light, a voltage signal, the voltage signal corresponding to a railway crossing event and being supplied to the first warning light at a switching frequency;
  initiating a warning light flashing sequence, the warning light flashing sequence including:
    during a first time period, illuminating the first warning light during receipt of the voltage signal in a flashing pattern, the flashing pattern having a flashing frequency of at least two flashing events within a single switching period defined by the switching frequency;
  during a second time period after the first time period, discontinuing the flashing pattern and illuminating the warning light in accordance with the voltage signal at the switching frequency; and
  upon determining that receipt of the voltage signal at the warning light assembly is discontinued for a plurality of switching periods, reinitializing the warning light flashing sequence for a next railway crossing event.

13. The method of claim 12, wherein the first time period is at least 15 seconds.

14. The method of claim 12, wherein the warning light assembly further includes a second warning light, and wherein the voltage signal is received in an alternating pattern between the warning light and the second warning light in accordance with the switching frequency.

15. The method of claim 14, wherein the method includes, during the first time period, illuminating the second warning light during receipt of the voltage signal at the second warning light in a second flashing pattern at the flashing frequency.

16. The method of claim 12, wherein the voltage signal includes a high voltage signal phase and a low voltage signal phase within a switching period, and wherein, during the second time period, the warning light is illuminated during the high voltage signal phase and is not illuminated during the low voltage signal phase.

17. The method of claim 12, wherein the plurality of switching periods includes at least 5 switching periods.

18. A warning light assembly comprising:
  a light emitting device; and
  a control circuit having an input voltage connection and operatively connected to the light emitting device to selectively illuminate the light emitting device, wherein the control circuit is configured to:
  receive a voltage signal at the input voltage connection in response to a railway crossing event;
  initiate a warning light flashing sequence, the warning light flashing sequence including:
    during a first time period, illuminating the light emitting device during receipt of the voltage signal in a flashing pattern, the flashing pattern having a flashing frequency of at least two flashing events per second;
    during a second time period after the first time period, discontinuing the flashing pattern and illuminating the light emitting device in accordance with the voltage signal; and
    upon determining that receipt of the voltage signal at the warning light assembly is discontinued for at least for a predetermined time of at least five seconds, reinitializing the warning light flashing sequence for a next railway crossing event.

19. The warning light assembly of claim 18, wherein the light emitting device comprises an LED warning light.

20. The warning light assembly of claim 18, wherein the voltage signal is received at the control circuit at a switching frequency, and wherein determining that receipt of the voltage signal at the warning light assembly is discontinued for at least the predetermined time includes determining, at the control circuit, that the voltage signal is discontinued for a plurality of switching periods at the switching frequency.

* * * * *